US012274653B2

(12) United States Patent
Hart

(10) Patent No.: US 12,274,653 B2
(45) Date of Patent: Apr. 15, 2025

(54) HYDRAULIC DRIVE UNIT FOR A STRETCHER AND STRETCHER WITH A HYDRAULIC DRIVE UNIT

(71) Applicant: HAWE Hydraulik SE, Aschheim (DE)

(72) Inventor: Christian Hart, Nittendorf (DE)

(73) Assignee: HAWE HYDRAULIK SE, Aschheim (DE)

( * ) Notice: Subject to any disclaimer, the term of this patent is extended or adjusted under 35 U.S.C. 154(b) by 185 days.

(21) Appl. No.: 17/818,844

(22) Filed: Aug. 10, 2022

(65) Prior Publication Data

US 2023/0233392 A1 Jul. 27, 2023

(30) Foreign Application Priority Data

Aug. 17, 2021 (DE) ......................... 102021209014.1

(51) Int. Cl.

*A61G 7/10* (2006.01)
*A61G 1/013* (2006.01)
*A61G 1/04* (2006.01)
*A61G 1/056* (2006.01)

(52) U.S. Cl.

CPC ......... *A61G 7/1017* (2013.01); *A61G 1/0567* (2013.01); *A61G 1/013* (2013.01); *A61G 1/04* (2013.01); *A61G 1/0565* (2013.01)

(58) Field of Classification Search

CPC .... A61G 7/1017; A61G 1/0567; A61G 7/018; A61G 1/0262; A61G 7/012; A61G 3/0218; A61G 1/06

See application file for complete search history.

(56) References Cited

U.S. PATENT DOCUMENTS 4,287,910 A * 9/1981 Petersen ............... F16K 17/196 220/203.24
8,171,953 B2 * 5/2012 Adams .................. F16K 17/196 137/493.9
2003/0111114 A1 * 6/2003 Koo ...................... F16K 17/105 137/491

FOREIGN PATENT DOCUMENTS

DE 102018201456 A1 * 8/2019
DE 102018109352 A1 * 10/2019 ............. A61G 1/013
EP 0281052 A1 * 9/1988

(Continued)

OTHER PUBLICATIONS

"Pump Definition & Meaning." Merriam-Webster, Merriam-Webster, www.merriam-webster.com/dictionary/pump. Accessed Apr. 6, 2024. (Year: 2024).*

(Continued)

*Primary Examiner* — David R Hare
*Assistant Examiner* — Deborah Talitha Gedeon
(74) *Attorney, Agent, or Firm* — Dinsmore & Shohl LLP

(57) ABSTRACT

A hydraulic drive unit for a stretcher has a hydraulic circuit with a differential cylinder, a pump, a tank and a valve assembly. The differential cylinder includes a rod working chamber and a piston working chamber. The valve assembly is switchable into at least a first state and a second state, wherein the rod working chamber is connected to the tank in the first state and to the pump in the second state, and wherein the piston working chamber is connected to the pump in the first state and to the tank in the second state. The tank is a tank separated from the atmosphere with a variable tank volume, so that the hydraulic circuit is configured as a closed hydraulic circuit. A stretcher having such a hydraulic drive unit is also provided.

8 Claims, 6 Drawing Sheets

(56) References Cited

FOREIGN PATENT DOCUMENTS

| | | | | |
|---|---|---|---|---|
| ES | 2400770 A1 | * | 4/2013 | |
| ES | 1207486 U | * | 3/2018 | ........... B30B 9/3007 |
| WO | 2019201579 A1 | | 10/2019 | |

OTHER PUBLICATIONS

Buderus Logafix Membrane Pressure Expansion Vessel BU-H, white, 18 liters; https://www.heizungsdiscount24.de/ausdennungsgeraesse/buderus-loga.

* cited by examiner

HYDRAULIC DRIVE UNIT FOR A STRETCHER AND STRETCHER WITH A HYDRAULIC DRIVE UNIT

CROSS-REFERENCE TO RELATED APPLICATIONS

This application claims priority to Germany patent application 10 2021 209 014.1, filed Aug. 17, 2021, which is hereby incorporated by reference in its entirety.

FIELD OF THE INVENTION

The present invention relates to a hydraulic drive unit for a stretcher and to a stretcher comprising such a hydraulic drive unit.

BACKGROUND OF THE INVENTION

Hydraulic drive units for stretchers are known from the prior art, for example from WO 2019/201579 A1. Usually, the drive unit comprises a hydraulic circuit with a differential cylinder, a pump, a tank and a valve assembly. The differential cylinder has a rod working chamber and a piston working chamber. The valve assembly is switchable to at least a first state and a second state, wherein the rod working chamber is connected to the tank in the first state of the valve assembly and to the pump in the second state of the valve assembly, and wherein the piston working chamber is connected to the pump in the first state of the valve assembly and to the tank in the second state of the valve assembly. Typically, such a valve assembly for this purpose comprises a plurality of valves that can be switched, for example, magnetically, electrically, or hydraulically.

In mobile stretchers, these drive units are used to change the height of a patient supporting surface of the stretcher in relation to a chassis of the stretcher. Commonly, such stretcher have a scissor jack structure which is connected to the patient supporting surface on the one hand and to the chassis on the other. To change the height level of the patient supporting surface, the differential cylinder is retracted or extended accordingly.

The disadvantage of known solutions is that the pump may suck in air from or via the tank when the differential cylinder is extended. As soon as air is present in the hydraulic circuit, the pump can no longer generate the necessary operating pressure. Furthermore, the air also makes the hydraulic circuit overly compressible, which means that the differential cylinder can no longer be positioned accurately. This can lead to dangerous situations for a patient lying up on the patient supporting surface as well as for the operator of the stretcher.

For this reason, it must be ensured that the suction line of the pump is always positioned below the oil level in the tank. However, the further problem arises that, particularly with stretchers, it is generally not possible to position the tank accurately, e.g. horizontally, for example when the stretcher is loaded into a medical car or an incline has to be overcome. As a remedy, for example, a suction line with a flexible end weighted with a weight can be used.

Nevertheless, even such solutions cannot guarantee that only oil is sucked in. Furthermore, it is also a problem with the known solutions that oil escapes in certain positions of the stretcher.

SUMMARY OF THE INVENTION

It is therefore the object of the present invention to disclose a hydraulic drive unit for a stretcher, which prevents air from being sucked in in any position of the stretcher and at the same time prevents oil from leaking from the drive unit.

The solution of the problem is achieved with a hydraulic drive unit as disclosed herein. Preferable embodiments are also disclosed.

Compared to the solutions known from the prior art, the invention is characterized in particular by the fact that the tank is a tank separated from the atmosphere with a variable tank volume, so that the hydraulic circuit is configured as a closed hydraulic circuit. In other words, the tank is not a rigid container under atmospheric pressure with a defined volume, but a self-contained space that adjusts its volume according to the oil to be taken in or discharged. When the differential cylinder is retracted, the differential volume of oil, i.e. the volume of the piston rod, must be absorbed by the tank. The volume of the tank decreases accordingly when the differential cylinder is extended. This ensures that only a variable volume of oil is taken up by the tank. It can therefore be ensured that only oil is drawn in by the pump, regardless of the position of the hydraulic drive unit. Furthermore, this also results in a closed hydraulic circuit in which oil does not leak or escapes from the hydraulic drive unit in any position of the drive unit.

The invention thus prevents the pump from being unable to maintain the operating pressure due to air being drawn in. It also prevents undefined positions of the differential cylinder from occurring due to air in the system, which overall noticeably increases safety in the use of the stretcher for both a patient and the operator of the stretcher.

Preferably, the tank is a flexible tank and in particular comprises a flexible membrane. It is preferably for the flexible membrane to be configured as a tank membrane or as a bellows. The defined folding or bending points of the flexible membrane ensure that its volume adapts as desired to the oil to be taken in or discharged.

Alternatively, it may be preferably for the tank to be an elastic tank, for example in the form of an elastic bladder.

Preferably, the maximum tank volume essentially corresponds to the differential volume of the differential cylinder. As mentioned above, the differential volume is the difference in oil volume between the maximum volume of the rod working chamber (with maximum retracted differential cylinder) and the maximum volume of the piston working chamber (with maximum extended differential cylinder), which is determined by the volume of the piston rod. This ensures that an oversized tank is not installed and that the total installation space required is reduced.

Preferably, the drive unit further comprises a rigid hollow body, wherein the tank is disposed inside the hollow body. This ensures that the tank is not unintentionally damaged during operation of the stretcher and that the functionality of the hydraulic drive unit is not impaired.

In this connection, it is preferably if the hollow body has a relief to the environment, i.e. the atmosphere. In particular, the relief can be configured as a bore or through hole. The relief prevents an overpressure or underpressure from building up inside the hollow body due to the change in volume of the tank during operation of the stretcher.

According to a second aspect, a stretcher is proposed for solving the problem. According to the invention, the stretcher has a hydraulic drive unit as described above.

BRIEF DESCRIPTION OF THE DRAWINGS

The invention is explained in more detail below with reference to exemplary embodiments shown in the figures. The figures show schematically.

DETAILED DESCRIPTION OF THE INVENTION

Figure 1:
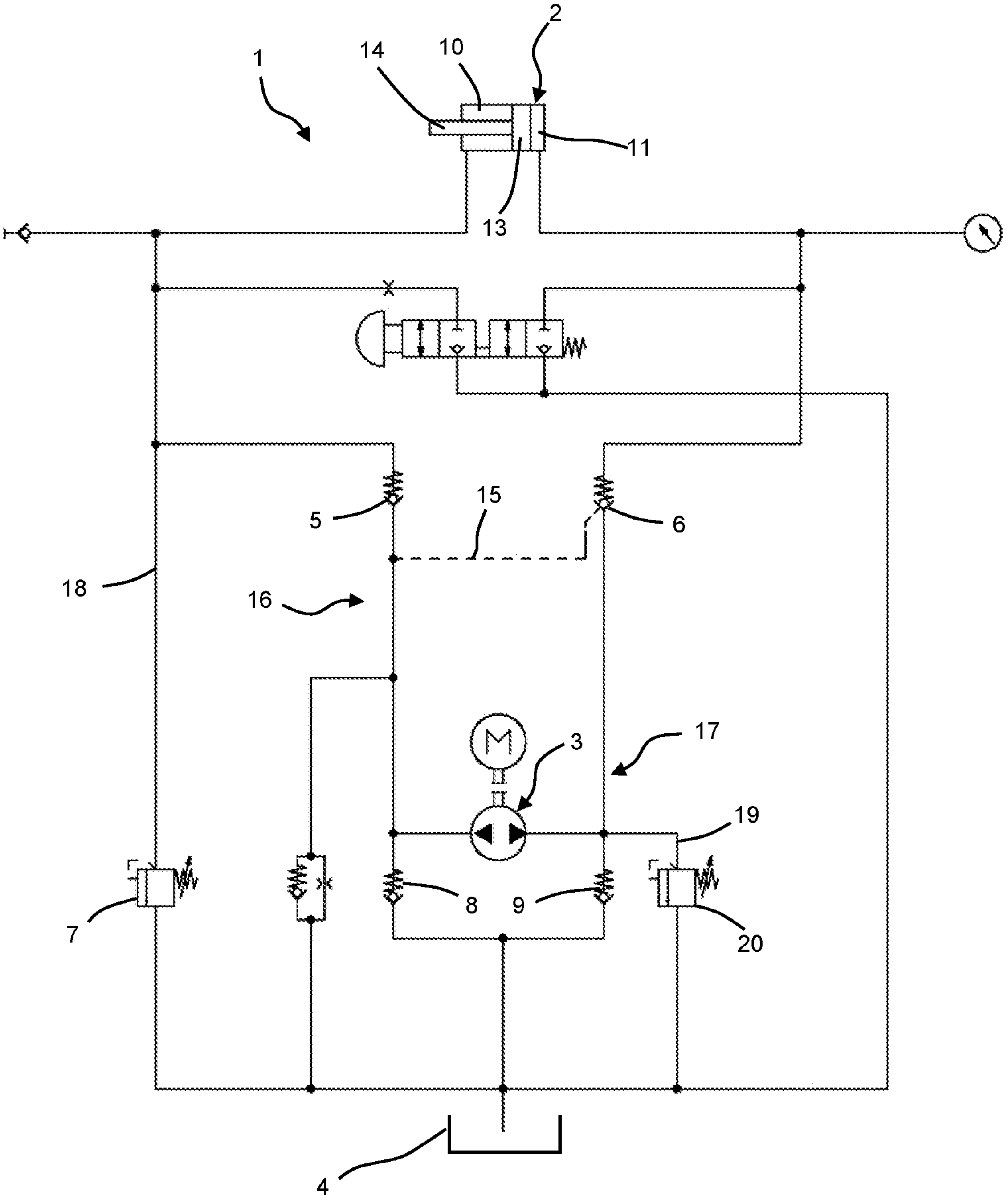
FIG. 1 is a hydraulic circuit diagram of a hydraulic drive unit according to the invention.

FIG. 1 shows a hydraulic circuit diagram of a hydraulic drive unit 1 according to the invention for a stretcher 100. The stretcher 100 is described in more detail below with reference to FIG. 6. The drive unit 1 has a differential cylinder 2, a pump 3 driven by a motor M, and a tank 4. The differential cylinder 2 comprises a piston 13 with a piston rod 14, wherein the piston 13 separates a rod working chamber 10 (on the side of the piston rod 14) from a piston working chamber 11.

Furthermore, the drive unit 1 comprises a valve arrangement with a plurality of valves. The rod working chamber 10 is connected to the pump 3 via a first line arrangement 16 and the piston working chamber 11 is connected to the pump 3 via a second line arrangement 17. A first spring-loaded check valve 5 is disposed in the first line arrangement 16, which opens in the direction of flow from the pump 3 to the rod working chamber 10. A second spring-loaded check valve 6 is disposed in the second line arrangement, which opens in the direction of flow from the pump 3 to the piston working chamber 11. Furthermore, the second check valve 6 is a pilot operated check vale and thus hydraulically openable by a control line 15 branching off from the first line arrangement 16 between the pump and the first check valve 5 and acting on the second check valve 6 in the opening direction. Furthermore, a first return line 18 connected to the tank 3 branches off from the first line arrangement 16 between the first check valve 5 and the rod working chamber 10. A first pressure relief valve 7 is arranged in the first return line 18.

A third spring-loaded check valve 8 is arranged between the first line arrangement 16 or the pump 3 respectively, and the tank 4, which opens in the direction of flow from the tank 4 to the pump 3. Accordingly, a fourth spring-loaded check valve 9 is arranged between the second line arrangement 17 or the pump 3 respectively, and the tank 4, which also opens in the direction of flow from the tank 4 to the pump 3.

A second return line 19 connected to the tank 4 branches off between the fourth check valve 9 and the third check valve 6. A second pressure relief valve 20 is arranged in the second return line 19.

To extend the differential cylinder 2, the pump 3 is controlled in such a way that the second line arrangement 17 is pressurized. The pump 3 draws oil at least partially from the tank 4 via the third (open) check valve 8 and delivers it via the second line arrangement 17 and the (open) second check valve 6 into the piston working chamber 11. The piston 13 thus moves together with the piston rod 14 and forces the oil out of the rod working chamber 10 into the first return line 18. There, the first pressure relief valve 7 opens and the oil can flow off in the direction of the tank 4 or be drawn in again directly via the pump 3. This can also be referred to as the first state of the valve arrangement.

To retract the differential cylinder 2, the pump 3 is controlled so that the first line arrangement 16 is pressurized. The pressure present in the first line arrangement 16 is signaled via the control line 15 to the second check valve 6, which thus opens. Thus, the oil flowing off from the piston working chamber 11 can be partially sucked back in directly by the pump 3. Since the maximum volume of the rod working chamber 10 when the differential cylinder 2 is fully retracted is smaller than the maximum volume of the piston working chamber 11 when the differential cylinder 2 is fully extended, due to the piston rod 14, the excess differential volume thus formed is directed to the tank 4 via the first return line 18 and the first pressure relief valve 7. This can also be referred to as the second state of the valve arrangement.

Consequently, the tank 4 is filled when the differential cylinder 2 is retracted and emptied when the differential cylinder 2 is extended. In order to prevent air from being drawn in when the differential cylinder 2 is extended, the tank 4 is configured according to the invention as a tank 4 separated from the atmosphere with a variable tank volume, so that the hydraulic circuit as a whole is configured as a closed hydraulic circuit.

In the following, two embodiments of the inventive hydraulic drive unit 1 are described with reference to FIGS. 2 to 5, which differ in the design of the tank 4.

Figure 2:
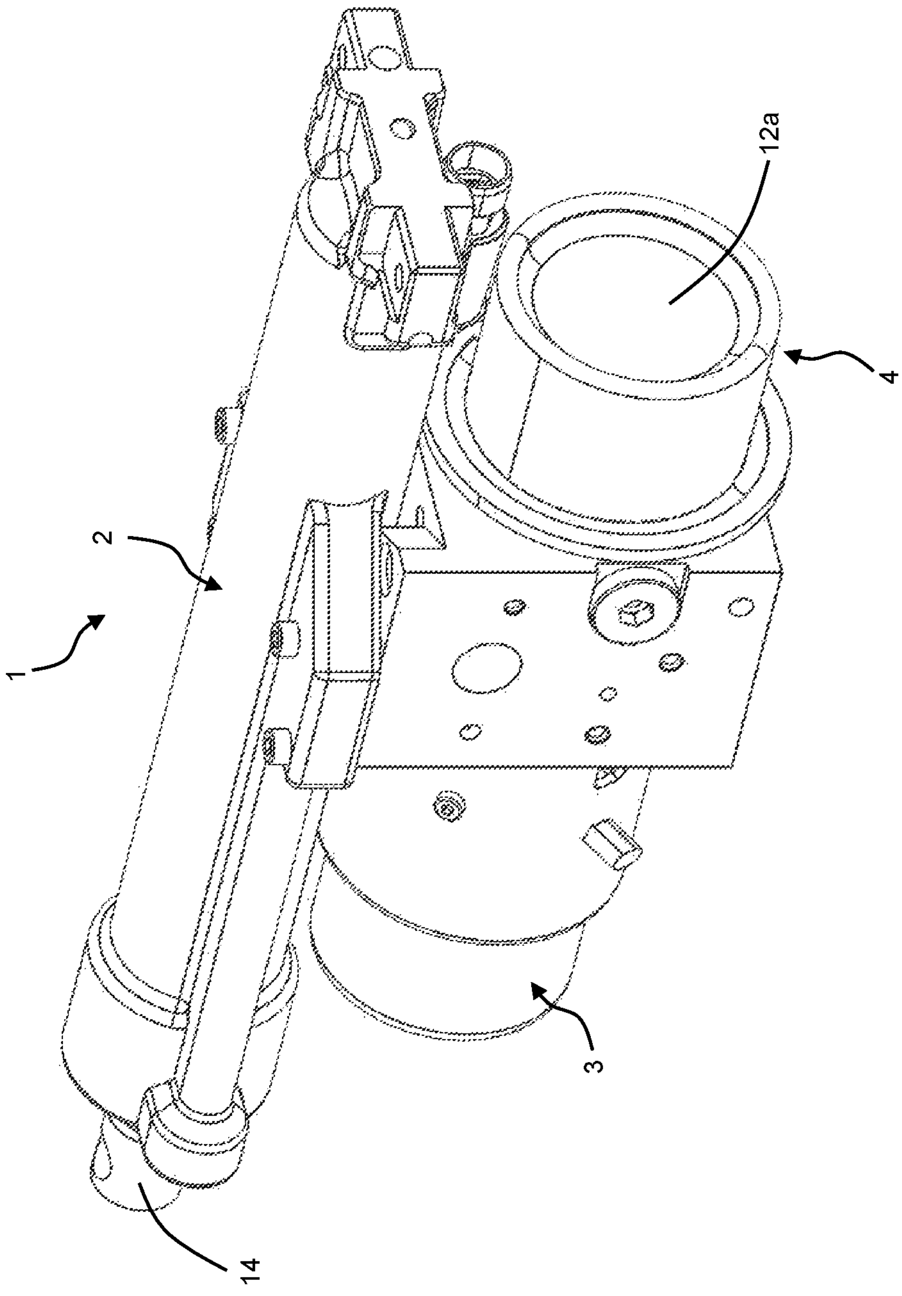
FIG. 2 is a perspective view of a hydraulic drive unit according to the invention in accordance with a first embodiment.
Figure 3:
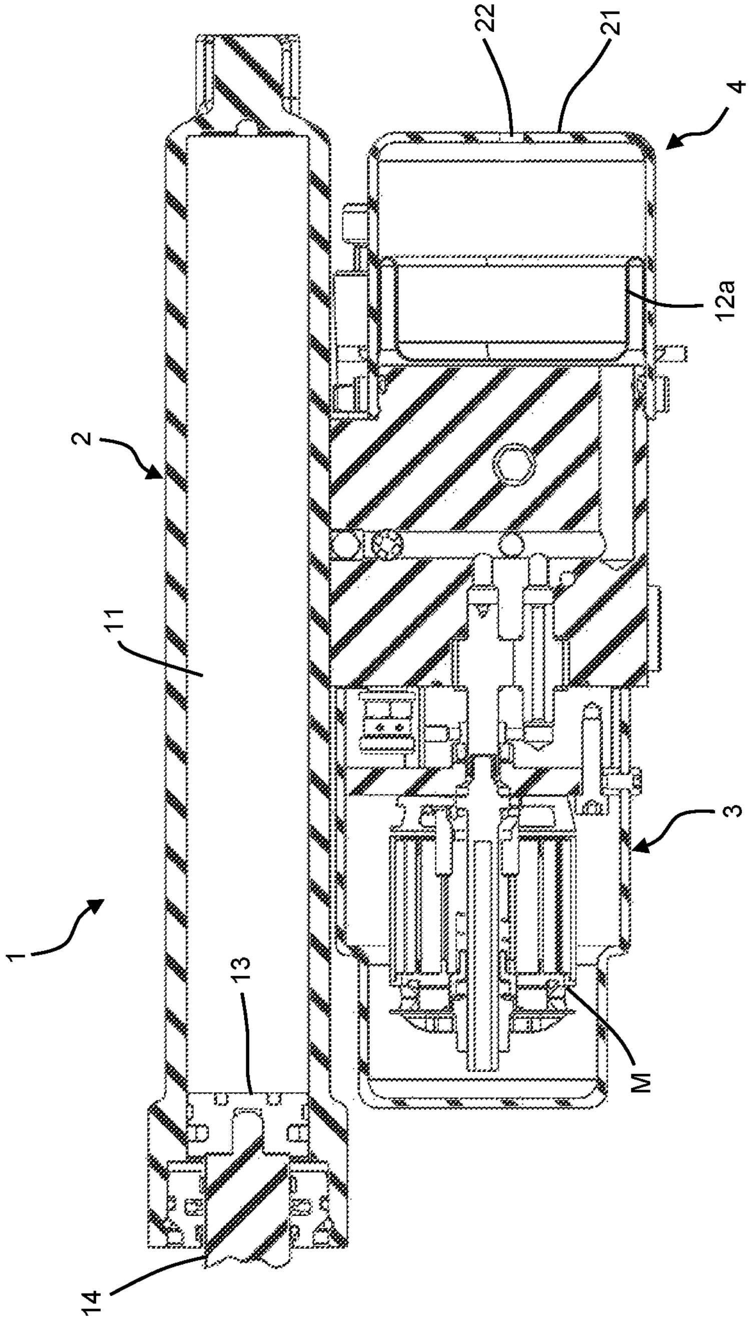
FIG. 3 is a cross section through the hydraulic drive unit shown in FIG. 2 with minimum tank volume.
Figure 4:
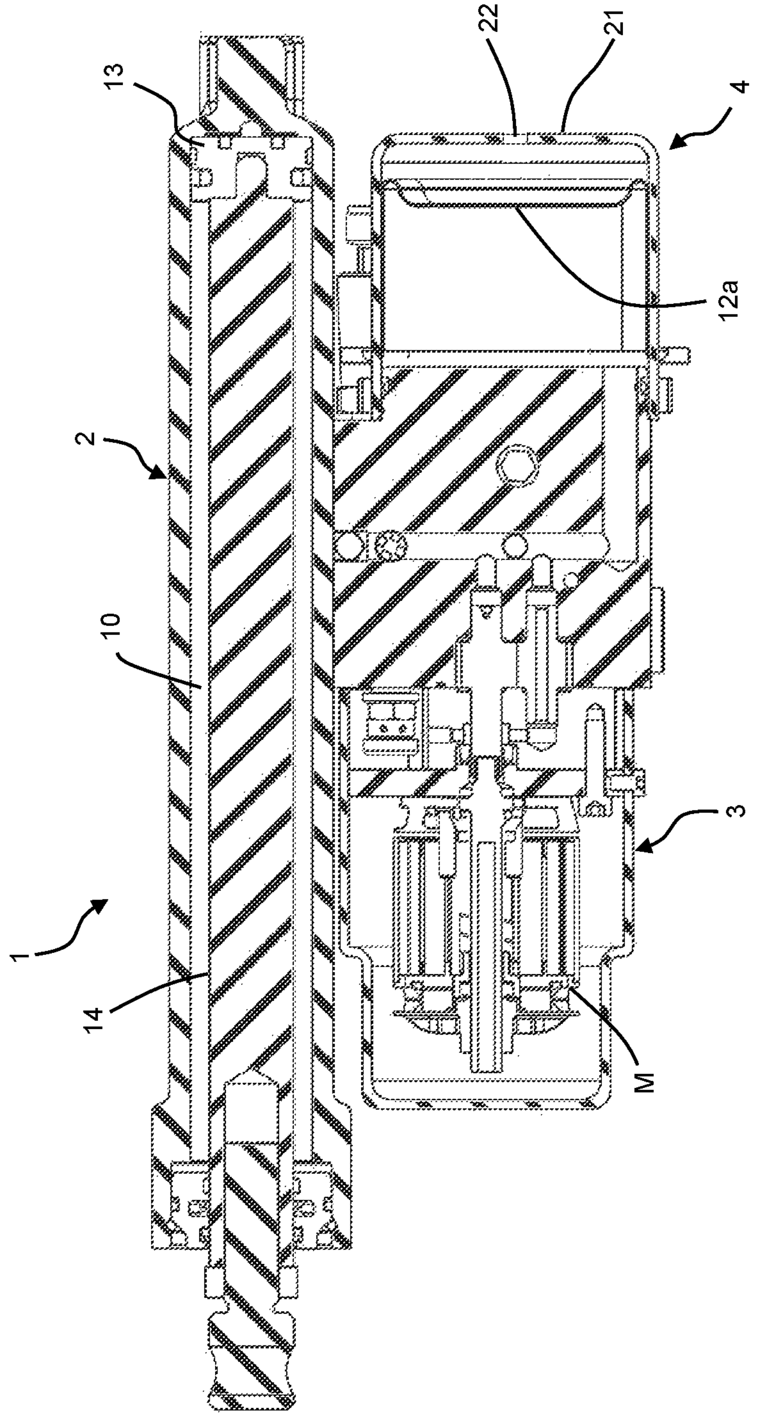
FIG. 4 is a cross section through the hydraulic drive unit shown in FIG. 2 with maximum tank volume.

FIGS. 2 to 4 show a first embodiment example of a hydraulic drive unit 1 according to the invention. In this embodiment, the tank 4 is a flexible tank and comprises a flexible membrane configured as a tank membrane 12*a*. As shown in FIGS. 3 and 4, the tank membrane 12*a* is disposed within a hollow body 21 configured as a cap. The cap 21 protects the tank membrane 12*a* from damage. Further, the cap 21 has a relief 22 configured as a bore that connects the interior of the cap 21 to the environment. Here, the bore 22 passes centrally through the cap 21. However, various designs of the relief are possible, for example also a plurality of radial perforations. It should be noted that the cap 21 is not shown in FIG. 2.

The tank membrane 12*a* is initially completely folded in when the differential cylinder 2 is fully extended, see FIG. 3. The tank 4 thus has its minimum volume. When the differential cylinder 2 is retracted, oil is fed into the tank 4 as described above and the tank membrane 12*a* folds out. When the differential cylinder 2 is fully retracted, the differential volume is fully accommodated in the tank 4 and the tank membrane 12*a* is folded out to its maximum, see FIG. 4. In this example, the tank membrane 12*a* is configured so that the maximum tank volume is at least equal to the differential volume. Air inside the cap 21 can escape or be sucked in through the relief 22 when the tank membrane 12*a* is folded in or out. It should be noted that in FIG. 3 the piston rod 14 is only partially shown for clarity reasons.

Figure 5:
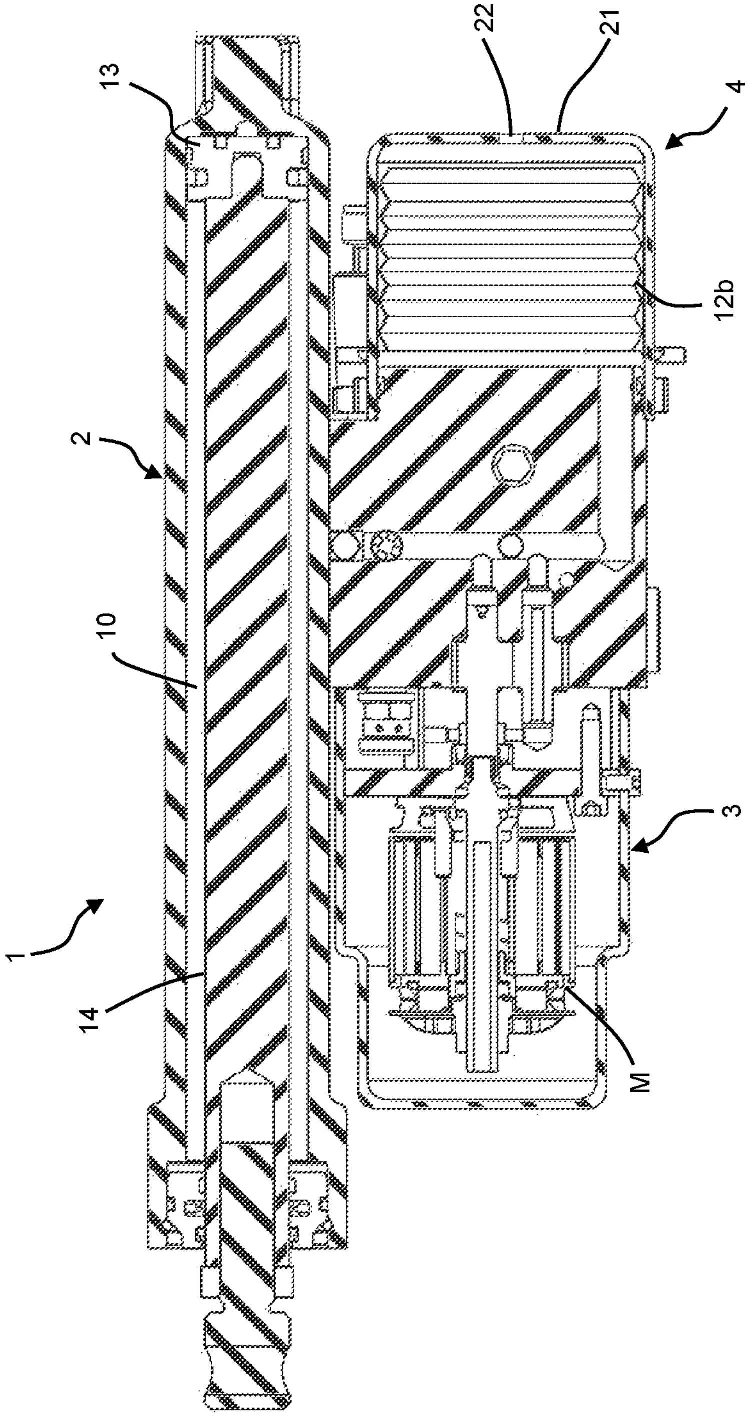
FIG. 5 is a cross section through a hydraulic drive unit according to a second embodiment.

FIG. 5 shows a second exemplary embodiment of a hydraulic drive unit 1 according to the invention. The second embodiment differs from the first embodiment shown in FIG. 4 in that the tank 4 comprises a bellows 12*b* instead of a tank membrane, whereby in FIG. 5 only the maximum tank volume is shown with the bellows 12*b* fully unfolded and thus with the differential cylinder 2 fully retracted. The bellows 12*b* is also configured so that the maximum tank volume corresponds at least to the differential volume.

Figure 6:
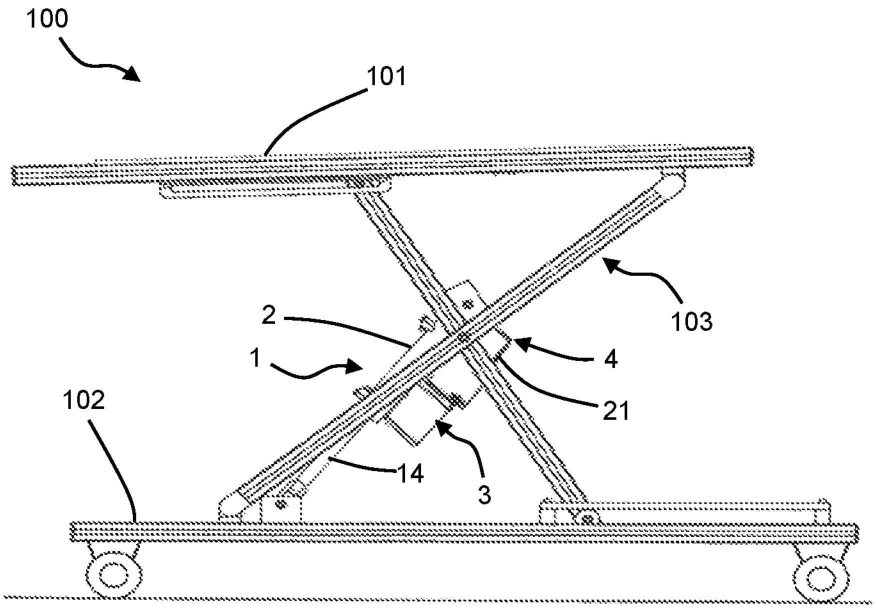
FIG. 6 is a side view of a stretcher according to the invention.

FIG. 6 shows a side view of a stretcher 100 according to the invention. The stretcher 100 has a patient supporting surface 101, a chassis 102, a scissor jack structure 103, and a hydraulic system 1 described above. The differential cylinder 2 is attached to the scissor jack structure 103 and the chassis 102 such that pressurization of the piston working chamber 11 raises the patient supporting surface 101 relative to the chassis 102. Accordingly, when the rod workspace 10 is pressurized, the patient supporting surface 101 is lowered relative to the chassis 102.

LIST OF REFERENCE CHARACTERS

1 hydraulic drive unit
2 differential cylinder
3 pump
4 tank
5 first check valve
6 second check valve
7 first pressure relief valve
8 third check valve
9 fourth check valve
10 rod working chamber
11 piston working chamber
12*a* tank membrane
12*b* bellows
13 piston
14 piston rod
15 control line
16 first line arrangement
17 second line arrangement
18 first return line
19 second return line
20 second pressure relief valve
21 hollow body/cap
22 relief/bore
100 stretcher
101 patient supporting surface
102 chassis
103 scissor jack structure
M motor

The invention claimed is:

1. A hydraulic drive unit for a stretcher, the drive unit comprising:

a hydraulic circuit with a differential cylinder, the differential cylinder having a rod working chamber and a piston working chamber;

a pump;

a tank;

a rigid hollow body, wherein the tank is disposed within the hollow body, and the hollow body has a relief to the environment; and a valve assembly switchable into at least a first state and a second state, wherein the rod working chamber of the differential cylinder is connected to the tank in the first state and to the pump in the second state, and wherein the piston working chamber of the differential cylinder is connected to the pump in the first state and to the tank in the second state;

wherein the tank is an elastic tank separated from atmosphere with a variable tank volume so that the hydraulic circuit is configured as a closed hydraulic circuit.

2. The hydraulic drive unit according to claim 1, wherein the tank is a flexible tank.

3. The hydraulic drive unit according to claim 2, wherein the flexible tank comprises a flexible membrane.

4. The hydraulic drive unit according to claim 3, wherein the flexible membrane is configured as a tank membrane.

5. The hydraulic drive unit according to claim 3, wherein the flexible membrane is configured as a bellows.

6. The hydraulic drive unit according to claim 1, wherein a maximum tank volume essentially corresponds to a differential volume of the differential cylinder.

7. The hydraulic drive unit according to claim 1, wherein the relief is configured as a bore.

8. A stretcher comprising a hydraulic drive unit according to claim 1.

* * * * *